W. EAST, A. E. DOBBS & J. S. HOWKINS.
THERMOSTATIC LIQUID LEVEL REGULATOR.
APPLICATION FILED JUNE 10, 1911.
1,047,769.
Patented Dec. 17, 1912.
3 SHEETS—SHEET 1.
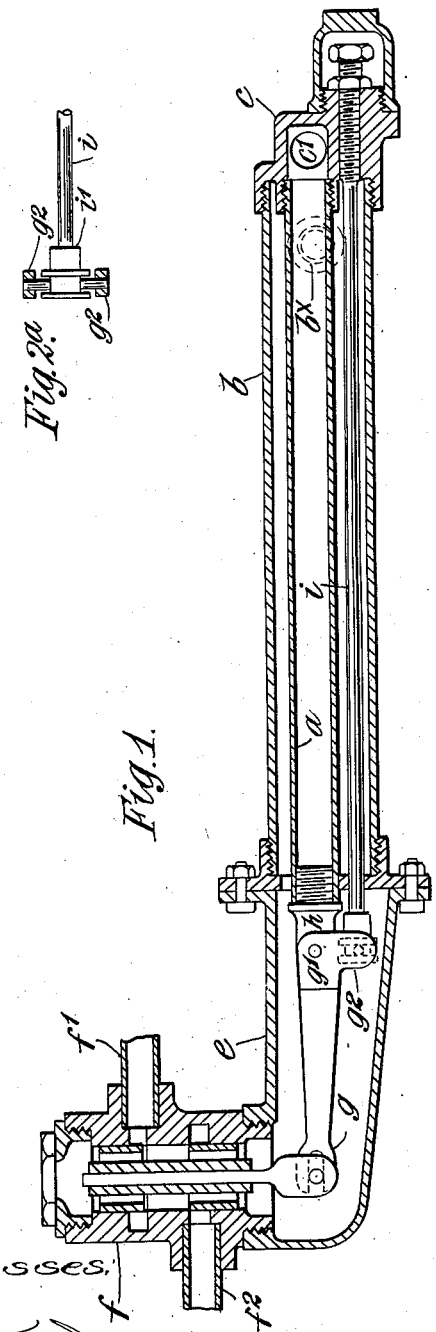
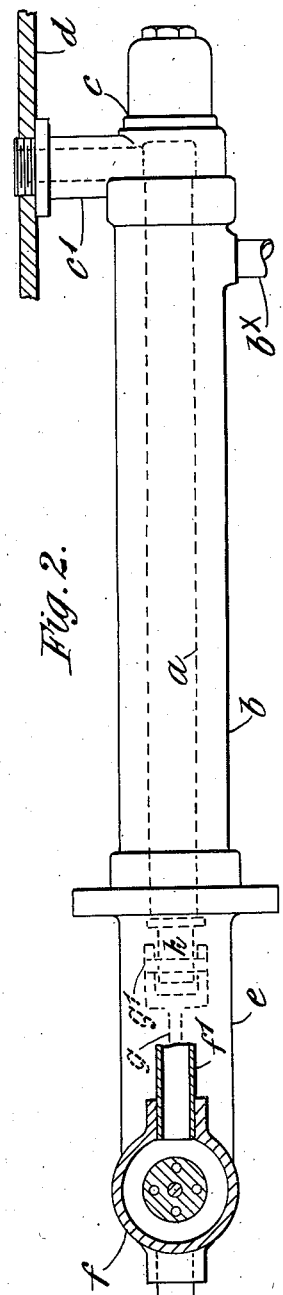

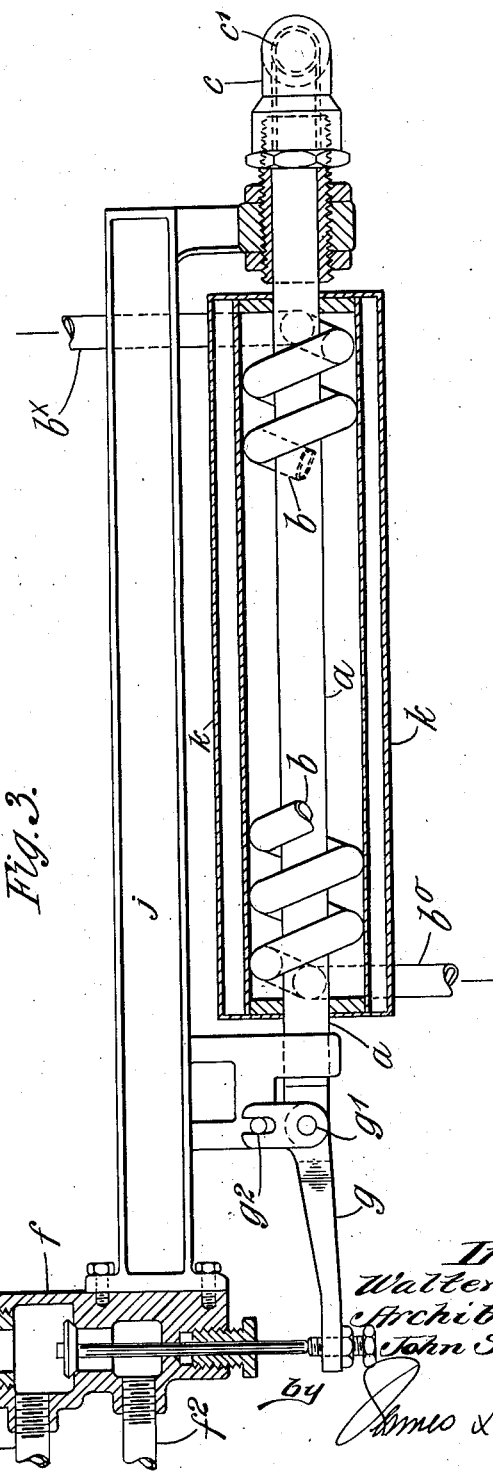

W. EAST, A. E. DOBBS & J. S. HOWKINS.
THERMOSTATIC LIQUID LEVEL REGULATOR.
APPLICATION FILED JUNE 10, 1911.
1,047,769.
Patented Dec. 17, 1912.
3 SHEETS—SHEET 3.
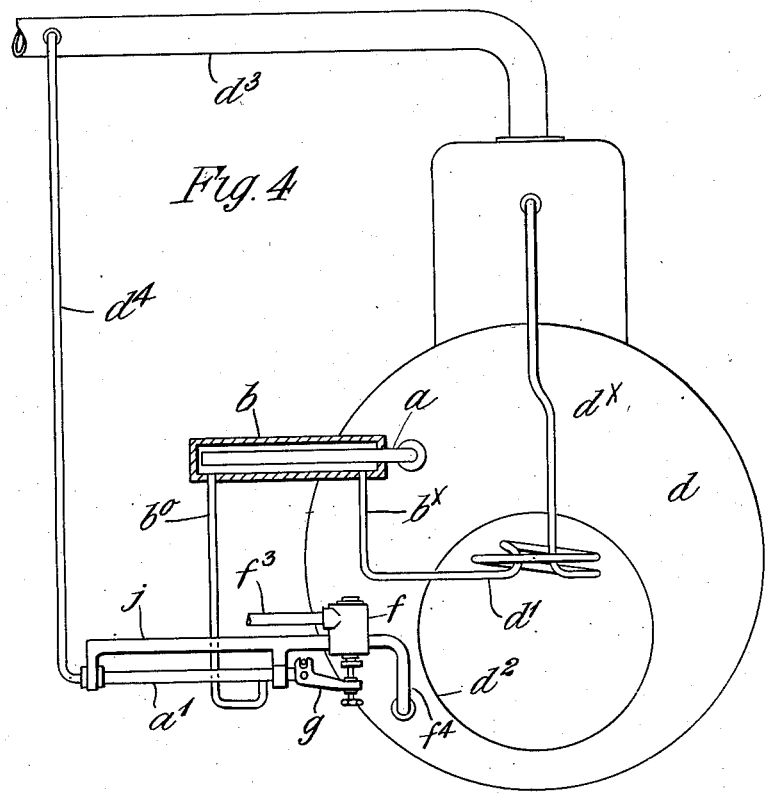
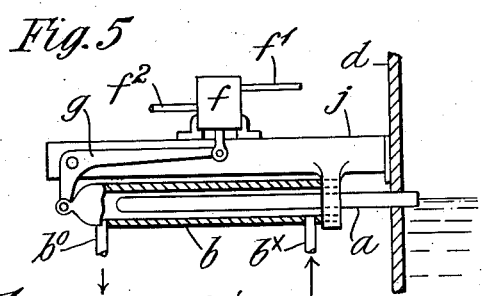
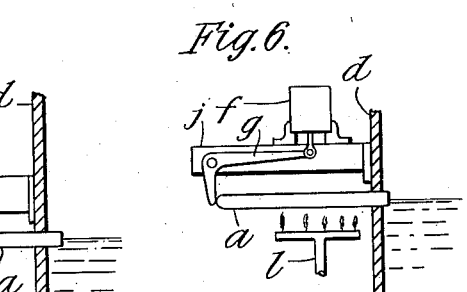
Witnesses:
Inventors
Walter East
Archibald E. Dobbs
John S. Howkins
by

UNITED STATES PATENT OFFICE.

WALTER EAST, OF BOURNEMOUTH, ENGLAND, ARCHIBALD EDWARD DOBBS, OF CARRICKFERGUS, IRELAND, AND JOHN SHIRLEY HOWKINS, OF FULHAM, LONDON, ENGLAND.

THERMOSTATIC LIQUID-LEVEL REGULATOR.

1,047,769.  Specification of Letters Patent.  Patented Dec. 17, 1912.

Application filed June 10, 1911. Serial No. 632,443.

*To all whom it may concern:*

Be it known that we, WALTER EAST, ARCHIBALD EDWARD DOBBS, and JOHN SHIRLEY HOWKINS, all subjects of the King of Great Britain, residing, respectively, at Bournemouth, Hants, England; Carrickfergus, Antrim, Ireland, and Fulham, London, England, have invented certain new and useful Thermostatic Liquid-Level Regulators, of which the following is a specification.

This invention has reference to means for maintaining or regulating the level of liquid in steam generators and the like, and relates *inter alia* to apparatus of the kind in which an expansible or thermostatic device or tube is arranged at the proper level in such a way that it will, under the action of superheated steam, operate a valve when the water level sinks too low, on the lines described in the specification of our British Letters Patent No. 5,587 of 1909.

The present invention is designed to provide a simple and convenient apparatus operating on the same principle, which can be easily fitted to the boiler entirely from the outside, and shall be readily accessible for inspection and repairs, while at the same time obviating any necessity for removing any manhole covers or otherwise interfering with the ordinary fittings of the boiler to which the device is to be applied.

According to this invention, the thermostatic apparatus is so arranged that the boiler water, when at the proper level, enters a plain tube or chamber situated at the said level and subject only to the thermal action of a medium having a higher temperature than the boiler steam, such for instance as superheated steam, hot gases or a gas flame as distinguished from known thermostatic arrangements which have been proposed to be placed outside of the boiler, and which (although heated by hot gases) have had the feed water introduced directly into them and therefore have been liable to have their temperature interfered with by the cooling action of said feed-water and by the intermittent flow of the same. The said plain tube may itself form the expansible device of the thermostat, but this is not strictly essential, as in some cases it may be separate therefrom, although arranged to modify or control the temperature of the expanding device.

To more clearly define what is meant by a "plain" tube in this case, it may be stated that the term is used herein to mean a tube or chamber which is simply arranged to receive steam or water from the boiler, according to the level, instead of being combined (as in the known arrangements referred to) with additional internal tubes or fittings which serve both to receive the feed-water and also to directly control the flow of such feed-water.

If a steam jacket or the like be used around the plain tube or expansible device of the thermostat, there is led into the same, superheated steam, gas or fluid, from any convenient superheating device, such as a system of coiled tubes, suitably situated in the boiler furnace or in the path of the products of combustion, or even having an independent source of heat. This steam, gas or fluid may if desired be drawn from the boiler itself and after it has passed first through the superheater and then through the jacket of the thermostatic tube or expansible device, may in some cases be led away to the engine or other apparatus which the boiler is feeding. In other cases however the tube or expanding device may be heated directly, say by a gas flame.

In general, the expansible thermostatic device or tube is connected with a valve of any suitable kind mounted on or connected with the boiler shell or framing, the arrangement being such that when the device expands beyond a certain definite limit for which it is set, it will open the valve and thereby bring about a further admission of liquid to the boiler. Usually this valve will be a steam valve so arranged as to start a pump or injector when it is opened. It may however be a water valve controlling the flow of water under pressure into the boiler, or in some cases an electric contact switch may be used instead of a valve. Such valve arrangements in themselves form no part of the present invention however.

In order that the invention may be clearly understood and readily carried into effect reference will now be had to the accompanying diagrammatic drawings which illustrate, by way of example, different forms of the improved apparatus and in which:—

Figure 1 is a longitudinal section of a thermostatic regulator in which a plain horizontal tube is surrounded by a plain tubular steam jacket, and in which the lengthening and shortening of the tube gives the thermostatic action. Fig. 2 is a plan of this arrangement. Fig. 2ª is a detail view hereinafter referred to. Fig. 3 is a corresponding view of an analogous arrangement in which however the thermostatic tube is surrounded by a spiral tube for the superheated steam instead of by a plain steam jacket. Fig. 4 illustrates the general arrangement for the connections of the thermostat with the boiler, and also shows a further modification in the construction of the thermostat. Fig. 5 illustrates a modification in which the expansion and contraction of the outer or jacketing tube is employed to give the thermostatic action. Fig. 6 illustrates an apparatus heated by a gas jet instead of by a steam jacket.

Throughout the drawings the same letters of reference are used to indicate analogous parts.

Referring more particularly to Figs. 1 and 2:—$a$ and $b$ represent inner and outer tubes or vessels which are secured at one end in a hollow casting or block $c$ having an inlet pipe $c'$ screwed into the boiler shell $d$ at the proper water level. The pipe $c'$ may contain a shut-off valve or tap if desired.

The tube $a$ is so arranged that it lies in a horizontal plane at the mean water level line of the boiler, so that when the water is at this (the proper) level it enters the said tube $a$ freely. The tube $b$ is supplied by a pipe $b^\times$ with steam or other fluid superheated by any convenient means, such as a tubular coil $d'$ (Fig. 4) arranged in the boiler furnace $d^2$ as in the patent above referred to. This tube $b$ forms therefore a hot jacket for the inner tube $a$, and may in its turn be provided with a lagging or covering of non-conducting material to prevent the temperature of the atmosphere from affecting it. These two tubes form therefore a heat exchanging system between the boiler water in $a$ and the superheated fluid in $b$, and the thermostatic action depends upon this exchange of heat, as will be hereinafter more fully explained.

$e$ is an extension piece or casing which carries a feed-controlling device or valve arrangement $f$ and contains a bent or bell-crank multiplying lever $g$ or other contrivance for working the latter.

In the example shown the device $f$ is a valve which may be of any suitable construction such as a double piston valve (as shown) for instance. It is arranged to control the passage of steam from the jacket either to a pipe $f'$, connected for example with the live-steam main, or to a pipe $f^2$ leading to the feed pump, so that when the boiler water level sinks and the valve $f$ descends under the control of the thermostat, the jacket steam flows to the said feed pump and puts it in operation.

The lever $g$ is connected at its angle or knee $g'$ to a block $h$ screwed into the tube $a$, and the short (or vertical) arm of the lever is connected at $g^2$ to an inextensible rod or device $i$. This inextensible device, shown in the form of a plain rod for convenience, may be made of any suitable non-expanding or practically non-expanding metal or alloy, or it may be constructed on the well-known grid-iron pendulum principle, so that it will not vary in length with variations in temperature. Its object is to provide an immovable connection or anchorage for the fulcrum pin $g^2$ at the end of the short arm of the bell crank lever. This latter arm may moreover be forked and engage (see detail view Fig. 2ª) in an annular groove or collar $i'$ in the end of the rod $i$, thus permitting the rod which is screwed into the block $c$, to be turned in the said block to adjust it to the exact length when fitting the parts together, as will be clear from the drawing.

By reason of its connection with the inextensible device $i$, the fulcrum $g^2$ of the lever is held in one definite position, while the knee part $g'$ moves to and fro as the tube $a$ varies in length, and thus an angular movement is imparted to the lever which causes its free end to operate to feed control valve or device $f$.

The action will be readily understood:— When the tube $a$ is partly or entirely full of water, which enters it from the boiler when the water level is correct, the temperature of the said tube will be nearly the same as that of the water, in spite of the fact that the tube may be jacketed with superheated steam. This is owing to the fact that the water possesses a much greater heat absorbing capacity than does the steam, and opposes the heating effect of the superheated steam. At this time the thermostatic tube is at its ordinary working temperature and its length is normal, while the feed control valve or device $f$ is so adjusted that it is just inoperative under these circumstances. If therefore the water level falls and the tube $a$ becomes empty, the said tube increases in length under the now unopposed heating action of the superheated steam, and through the medium of the lever $g$, operates the valve or device $f$ and keeps it operating until the water level has been again restored, whereupon boiler water again enters and cools the tube $a$ and the valve $f$ closes.

The thermostatic tube may project outwardly from the boiler shell or may lie parallel therewith, or be curved concentrically thereto and may communicate directly with the interior of the boiler or have one or more branch tubes leading into the latter from different points along its length. Release outlets for steam may be provided to allow a constant flow of superheated steam through the arrangement, in order to keep such superheated steam in the jacket always fresh and of the full temperature.

The thermostatic device instead of being straight as shown, may, by having the tubes $a$ and $b$ of curved shape be bent or looped to allow for expansion, and may be carried by any suitable devices let into the boiler and provided with removable plugs for clean-out the tube in case it should become obstructed. In some instances it may be fitted to lie inside the boiler, or in a tube or casing let into the same, and be at or near the center line of the boiler where the motion of the water, in a marine boiler for instance, will probably be least.

The jacketed thermostat tube, in addition to being curved or bow shaped as just indicated, may be so arranged that the water has access to both ends of it, or so that one end is connected with the water space of the boiler while the other end is connected with the steam space either directly or by any suitable connecting tube.

Referring now to the arrangement shown in Fig. 3, it will be seen that the feed control device or valve $f$ and lever $g$ are carried on an arm or bracket $j$ instead of being supported on the steam jacket. Moreover the latter is now formed by a tubular coil $b$ surrounding the inner tube $a$. This coil has an inlet pipe $b^x$ and an outlet pipe $b^o$, and is inclosed in a sheath or casing $k$ filled with suitable non-conducting material or lagging. The hollow space inside this jacket may be filled with air or with a liquid which will better facilitate the exchange of heat between $a$ and $b$. In other respects the arrangement is analogous to that of the Fig. 1 arrangement as will be clear. The valve $f$ may be combined with a spring tending to keep it closed.

The general view shown in Fig. 4, illustrates the main arrangement of the parts, the steam for operating the thermostat being led from the dome or steam space of the boiler $d$ by a pipe $d^x$ to any convenient superheater, such as a coil $d'$ arranged in the boiler furnace $d^2$ whence it passes by the pipe $b^x$ to the thermostatic apparatus. The modification of the latter shown in this figure is divided into two parts, the upper part ($a$, $b$) forming the heat-exchanger, being distinct from the lower part ($a'$, $f$, $g$) which forms the actual thermostat. The construction of the lever and valve parts $g$ and $f$ and of their supporting bracket is the same as that shown at the left hand end of Fig. 3. In this case the steam or fluid in the jacket or tube $b$ is more or less cooled or varied in temperature by the action of the tube $a$ and then passes down the pipe $b^o$ into the expansion device or tube $a'$ after flowing through the latter, it passes thence through a connecting pipe $d^4$ back to the steam main $d^3$. Owing to the variations in its temperature caused by the boiler water in the tube $a$, the said steam sets up corresponding variations in the length of the tube $a'$, which latter through the lever $g$ and valve $f$, controls as before the feed supply to the boiler. With this modification a plain rod or bar might be used inside the tube $a'$ to give the expanding effect instead of using the expansion of the tube $a'$ itself. In the same way a thermostat comprising an expansible chamber filled with volatile liquid for instance, may be placed inside the tube $a'$.

The arrangement shown in Fig. 5 is as regards the action of the thermostat, an obvious converse of that in the Fig. 1 arrangement, and the construction is somewhat simplified on this account. In this case it is the outer or jacket tube or vessel $b$ which by its expansion and contraction operates the feed-control valve. To this end the tube $b$ is connected at its outer end to the lever $g$ and completely incloses the tube $a$. The superheated fluid in the tube $b$ is more or less cooled by the boiler water in the tube $a$, its mean temperature being made to depend upon the rate of heat exchange through the walls of the inner tube $a$. Hence the length of the outer tube $b$ varies according to this rate of the heat-exchange that is according to the water level, and thus the valve or device $f$ is in turn operated in the desired manner. In this case the pipes $b^x$ and $b^o$ as before represent respectively the inlet and outlet for the superheated steam in the jacket.

In any of the arrangements, the device $f$ may be simply any convenient valve adapted to control the flow of feed water into the boiler from a suitable high pressure supply. Such an arrangement is indicated in Figs. 4 and 5 where $f^3$ is the water supply pipe from a high pressure source and $f^4$ the pipe for leading such water direct into the boiler when the device $f$ permits it to flow.

In the arrangement shown diagrammatically in Fig. 6, the necessity for a steam jacket is obviated and the construction is correspondingly simplified. In this case the expansible device or tube $a$ is heated by a gas-burner arrangement $l$. When the boiler-water is at the proper level, the tube is prevented by it from being heated beyond a certain point. When however the water level falls, the heat from the gas burner (having practically nothing to counteract it) expands the empty tube, and the latter through the medium of the lever $g$ (operating as in Fig. 5) actuates the feed-control device f, whereby the water level in the boiler is again restored.

It will be readily understood that it is not necessary even for the apparatus to be directly attached to or mounted on the boiler, as the tube a of the heat exchanger may be placed in communication with the water space by a suitable connecting pipe which may be jacketed to prevent cooling. Moreover when the tube a is arranged to be heated as in Fig. 6, such heating may be effected by an electrical or an oil or paraffin heater or otherwise as desired.

What we claim as our invention and desire to secure by Letters Patent in the United States is:—

1. In a thermostatic apparatus for regulating the level of liquid in a steam generator or the like, the combination of a tube or chamber which the liquid enters when at the proper level, means for heating such tube or chamber to a higher temperature than the boiler steam and for using the boiler liquid and steam in opposition to such heating means so as to produce the desired expansion or contraction of said tube or chamber, and means for enabling such expansion and contraction to control the supply of liquid, substantially as described.

2. In a thermostatic apparatus for regulating the level of water in a steam boiler or the like, the combination of an external tube or chamber which the water enters when at the proper level, means for heating such tube or chamber to a higher temperature than the boiler steam and for using the boiler water in opposition to such heating means so as to vary the expansion or contraction of said tube or chamber, and means for enabling such expansion and contraction to control the supply of water, substantially as described.

3. In a thermostatic apparatus for regulating the level of liquid in a steam generator or the like, the combination of an external tube or chamber having its interior in communication with the water space at the water level, a steam jacket for said tube or chamber supplied with superheated steam, and means for controlling the feed supply by the expansion and contraction of said tube or chamber, substantially as described.

4. In a thermostatic apparatus for regulating the level of liquid in a steam generator or the like, the combination of an external expansible tube or chamber having its interior in communication with the water space at the water level, a steam jacket for said tube or chamber supplied with superheated steam, an inextensible device, a valve for controlling the feed, and a valve-operating lever connected both with said inextensible device and said expansible tube, substantially as described.

5. In a thermostatic apparatus for regulating the level of liquid in a steam generator or the like, the combination of an external expansible tube or chamber in free communication with the water space at the water level, a steam jacket for said tube or chamber supplied with superheated steam, an inextensible device situated in said jacket, a valve for controlling the feed, and a valve-operating lever connected with the tube and with said inextensible device, substantially as described.

6. In a thermostatic apparatus for regulating the level of liquid in a steam generator or the like, the combination of an external expansible tube in free communication with the interior of the boiler at the water level, a jacket surrounding said tube, a tube for superheated steam also inclosed in said jacket along with the expansible tube, a valve controlling the feed apparatus, a lever connected with said expansible tube and having one end acting on said valve, and a stationary support for the other end of the lever, substantially as described.

7. In a thermostatic apparatus for regulating the level of liquid in a steam generator, the combination of a horizontal tube opening into the boiler at the water level, means for heating said tube to a temperature above that of the boiler steam, a feed control valve, an operating lever connected therewith, and means for operating said lever and valve on the occurrence of an increase in the temperature of the tube, substantially as described.

8. In a thermostatic apparatus for regulating the water level in a boiler, the combination of a horizontal tube opening into the boiler at the proper water level, a steam jacket for said tube, means for supplying superheated steam to said jacket, a valve for controlling the boiler feed apparatus, and means for enabling said valve to be controlled by the expansion and contraction of the said jacket, substantially as described.

In testimony whereof we affix our signatures in presence of two witnesses.

WALTER EAST.
ARCHIBALD EDWARD DOBBS.
JOHN SHIRLEY HOWKINS.

Witnesses to the signature of Archibald Edward Dobbs:
PAUL KNABENSHUE,
EDWARD HARVEY.

Witnesses to the signatures of Walter East and John Shirley Howkins:
HERBERT D. JAMESON,
C. BARNARD BURDON.